US012662825B2

(12) United States Patent
Bossuyt et al.

(10) Patent No.: US 12,662,825 B2
(45) Date of Patent: Jun. 23, 2026

(54) FLOOR COVERING, UNDERLAYMENT AND FLOOR ELEMENT

(71) Applicant: UNILIN, BV, Wielsbeke (BE)

(72) Inventors: Jochen Bossuyt, Wielsbeke (BE); Jonas Van Hecke, Wielsbeke (BE)

(73) Assignee: UNILIN, BV, Wielsbeke (BE)

( * ) Notice: Subject to any disclaimer, the term of this patent is extended or adjusted under 35 U.S.C. 154(b) by 159 days.

(21) Appl. No.: 18/410,181

(22) Filed: Jan. 11, 2024

(65) Prior Publication Data

US 2024/0328172 A1      Oct. 3, 2024

Related U.S. Application Data

(60) Provisional application No. 63/492,480, filed on Mar. 28, 2023.

(51) Int. Cl.

| | |
|---|---|
| *E04F 15/22* | (2006.01) |
| *B29C 48/00* | (2019.01) |
| *B32B 7/12* | (2006.01) |
| *B32B 27/08* | (2006.01) |
| *B32B 27/20* | (2006.01) |
| *B32B 27/22* | (2006.01) |
| *B32B 27/30* | (2006.01) |
| *B32B 27/40* | (2006.01) |

(Continued)

(52) U.S. Cl.
CPC .......... *E04F 15/107* (2013.01); *B29C 48/022* (2019.02); *B32B 7/12* (2013.01); *B32B 27/08* (2013.01); *B32B 27/20* (2013.01); *B32B 27/22* (2013.01); *B32B 27/304* (2013.01); *B32B 27/40* (2013.01); *E04F 15/105* (2013.01); *B29K 2027/06* (2013.01); *B29L 2031/732*

(2013.01); *B32B 2250/02* (2013.01); *B32B 2250/24* (2013.01); *B32B 2264/10* (2013.01); *B32B 2307/748* (2013.01); *B32B 2419/04* (2013.01)

(58) Field of Classification Search
CPC ....... B32B 7/12; B32B 27/22; B32B 2419/04; B29L 2031/732
See application file for complete search history.

(56) References Cited

U.S. PATENT DOCUMENTS 5,919,549 A * 7/1999 Van ........................... B24D 3/28
                                                                442/67
6,316,075 B1   11/2001 Desai et al.
(Continued)

FOREIGN PATENT DOCUMENTS

| EP | 3459736 A2 | 3/2019 |
|---|---|---|
| EP | 3594430 A1 | 1/2020 |

(Continued)

OTHER PUBLICATIONS

Extended European Search Report from Corresponding European Patent Application No. EP24151333.2, Jul. 5, 2024.

*Primary Examiner* — Basil S Katcheves
(74) *Attorney, Agent, or Firm* — Workman Nydegger

(57) ABSTRACT

A floor covering includes an underlayment basic layer, at least one floor element and an adhesive layer. The adhesive layer is positioned in between the underlayment basic layer and the floor element. The underlayment basic layer includes fillers. The majority of the fillers have a Moh's hardness of 5 or less and/or the majority of the fillers is formed by $CaCO_3$ and/or talcum. The bottom of the underlayment is formed by a foil of polypropylene.

15 Claims, 2 Drawing Sheets

(51) Int. Cl.
    *E04F 15/10*      (2006.01)
    *B29K 27/06*     (2006.01)
    *B29L 31/00*     (2006.01)

(56)           References Cited

U.S. PATENT DOCUMENTS

| | | | |
|---|---|---|---|
| 10,493,736 | B2 | 12/2019 | Rose et al. |
| 10,677,275 | B1 * | 6/2020 | Caselli ............. E04F 15/02033 |
| 11,541,641 | B2 * | 1/2023 | Chen ..................... B32B 27/306 |
| 12,134,900 | B2 * | 11/2024 | Schacht ................. C08L 23/04 |
| 2006/0265966 | A1 * | 11/2006 | Rostal ................... B24D 3/004 |
| | | | 451/28 |
| 2020/0190824 | A1 * | 6/2020 | De Rick .............. E04F 15/105 |

FOREIGN PATENT DOCUMENTS

| | | | |
|---|---|---|---|
| WO | 2020075111 | A1 | 4/2020 |
| WO | 2021070105 | A1 | 4/2021 |

* cited by examiner

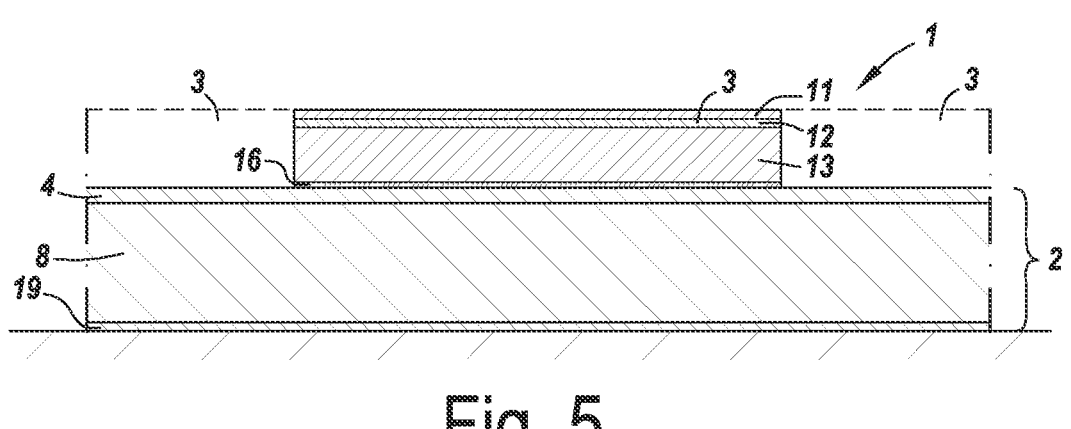
Fig. 5
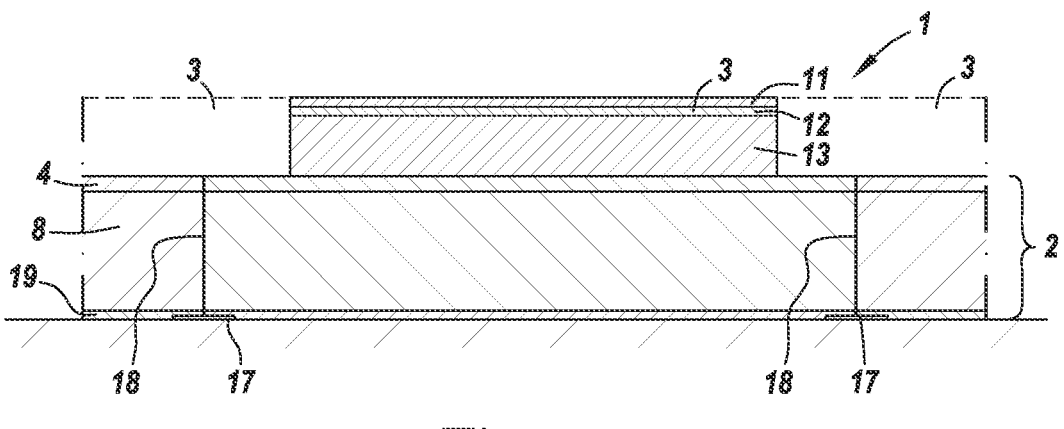
Fig. 6
Fig. 7

1

FLOOR COVERING, UNDERLAYMENT AND FLOOR ELEMENT

BACKGROUND

The present invention relates to a floor covering. In particular the present invention relates to a floor covering comprising an underlayment and a floor element.

A floor covering comprising an underlayment onto which a plastic floor element, such as a luxury vinyl tile (LVT), is glued is known in the prior art, for example in WO 2020/075111. Usually, the underlayment is installed loose on a subfloor and the floor elements are placed on top of the underlayment. In practice, the floor covering, in particular a floating floor covering, may show defects during its lifetime, such as dimensional deformation which may be accelerated under influence of heat. For example, the floor covering may locally obtain a cup shape or a dome shape during its lifetime due to curling of the floor element. This effect is undesired from at least an esthetic point of view. Furthermore, a floor covering comprising plastic floor elements glued to an underlayment may cause problems in removing and recycling the floor elements at the end of its service life.

EP 3 594 430 discloses an underlayment, comprising a polyurethane (PU) layer filled with sand or limestone, a nonwoven fabric on the underside of the polyurethane layer, and a self-adhesive film on the upper side of the polyurethane layer, wherein said self-adhesive film comprises a carrier film, an adhesive layer applied to the carrier film, and wherein a peelable protective film is present on the upper side of the self-adhesive film. The adhesive of the adhesive layer of the self-adhesive film is an acrylate adhesive, the carrier film is applied directly to the upper side of the polyurethane layer and the nonwoven fabric is applied directly to the underside of the polyurethane layer and forms the underside of the underlayment. Further, a mesh structure of fibers is embedded in the adhesive layer.

SUMMARY

The prime object of the present invention is to provide an alternative floor covering, with various preferred embodiments offering a solution for the above-mentioned problem.

A first independent aspect of the present invention is a floor covering comprising an underlayment basic layer, at least one floor element and an adhesive layer, wherein said adhesive layer is positioned in between said underlayment basic layer and said floor element, and wherein said floor element comprises at least one plasticizer, and wherein a barrier is formed to reduce plasticizer migration from said floor element towards said adhesive layer, said barrier preferably is formed by one or more of the following measures:

said adhesive layer has a lowered potential towards plasticizer absorption; and/or said floor element on its lower surface is treated thereby forming said barrier; and/or said floor element comprises a barrier layer at a distance from its upper surface forming said barrier, preferably a backing layer on its lower surface.

The floor covering of the invention offers a solution for at least the above-identified problem associated with known floor coverings, in particular as the barrier facilitates reducing plasticizer migration from the floor element towards the adhesive layer. Due to plasticizer migration towards the adhesive layer the adhesive properties of the adhesive layer might decrease. Furthermore, plasticizer migration may disturb the plasticizer balance in the floor element or it may even reduce the plasticizer content in the floor to a too low level. The floor covering of the invention may allow the plasticizer content and/or distribution within the flooring element to remain stable upon being brought into contact with the adhesive layer, and preferably even after a prolonged amount of time. By reducing plasticizer migration from the floor element towards the adhesive layer, occurrence of at least some of the aforementioned defects in the floor covering, in particular in the floor element, may thus be reduced or even eliminated.

It is noted that the floor covering may be installed by first laying the underlayment on a subfloor, possibly laying it loose on the subfloor. The underlayment may be supplied as a relatively large continuous piece, for example in the form of a roll which is unrolled on the subfloor. The dimensions of the underlayment may be larger than the dimensions of the floor element such that a plurality of floor elements are placed on top of the continuous piece of the underlayment. The floor elements may be placed adjacent to each other onto the underlayment without being locked directly to each other. Nevertheless, it is also possible that circumferential edges of the floor elements are provided with locking members for interlocking them. In the latter case the floor elements may be directly interlocked to each other as well as glued to the underlayment.

According to a particular embodiment, said floor element when applied on said underlayment basic layer has a mean value for final curling as measured according to ISO 23999:2018 of between –2.5 and 2.5 mm. By preference, said floor element when applied on said underlayment basic layer has a mean value for final curling as measured according to ISO 23999:2018 of between –1.0 and 0 mm, more by preference of between –0.8 and 0 mm, even more by preference of between –0.5 and 0 mm. The invention may thus provide for a floor covering wherein the floor elements show minimal cupping and/or doming. It is noted that cupping or doming of the floor element means curling of the floor element such that it shows a cup shape or a dome shape, respectively, in an installed condition of the floor covering. In other words, in case of cupping the upper surface of the floor element is concave and in case of doming the upper surface of the floor element is convex.

According to a first practical measure which forms an independent inventive aspect of the present invention, said adhesive layer has a lowered potential towards plasticizer absorption. By using an adhesive layer having a lowered potential towards plasticizer absorption, the adhesive layer may thus form a barrier which may reduce migration of plasticizer from said floor element towards said adhesive layer.

The adhesive layer may also contain a plasticizer. This minimizes a tendency of migration of the plasticizer from the floor element towards the adhesive layer.

The concentration of said plasticizer in the adhesive layer may be higher than 50%, preferably more than 75%, more preferably more than 100% of the concentration of said plasticizer in the floor element.

According to a further or another embodiment, said adhesive layer is present in an amount of between 5 and 90 g/m$^2$, by preference of between 5 and 75 g/m$^2$, more by preference of between 30 and 60 g/m$^2$. With increasing preference, by using a lower amount of adhesive to which the plasticizer tends to migrate, the adhesive layer may show less potential towards absorption of plasticizers.

According to some embodiments, said adhesive layer has a peeling strength as measured by DIN EN 1345:1993-12 of between 10 and 50 N/50 mm. Within the aforementioned range, good adhesion between the underlayment basic layer and the floor element may be obtained. By preference, said adhesive layer has a peeling strength as measured by DIN EN 1345:1993-12 of between 30 and 50 N/50 mm. The aforementioned range may be particularly beneficial in case the amount of adhesive layer is lowered, such that sufficient adherence may be obtained.

According to a further or another embodiment, said adhesive layer comprises a plasticizer content of between 50 and 200 phr. By selecting an adhesive layer comprising plasticizer in the aforementioned range, a certain level of plasticizer saturation in the adhesive layer may be obtained. As such, the potential of absorption of plasticizer in the adhesive layer may be reduced. By preference, said adhesive layer comprises a plasticizer content of between 75 and 100 phr.

According to some embodiments, said adhesive layer and/or said floor element comprises a plasticizer migration inhibitor, for example organic oligomers with reactive groups and liquid precursors, such as metal alkoxides.

According to a further or another embodiment, said adhesive layer may comprise a pressure sensitive adhesive (PSA). Pressure sensitive adhesives (PSA) are particularly suitable for installing floor elements on an underlayment basic layer as they provide sufficient, preferably reversible, adherence. Preferably said adhesive layer, more particularly said PSA, comprises an acrylic compound, a styrene block copolymer or a styrene-butadiene-styrene. Preferably said adhesive layer, more particularly said PSA, further comprises a tackifier, for example a rosin ester.

The adhesive layer according to some embodiments, may comprise one or more acrylic compounds, silicone compounds, elastomers, or combinations thereof. Aforementioned compounds are particularly suitable for formulating the adhesive layer, said adhesive layer preferably being of the pressure sensitive type, providing sufficient though reversible adherence.

By preference, acrylic compounds may be chosen from the group of acrylic polymers, acrylic copolymers, acrylic terpolymers, or combinations thereof. By combining one or more of the aforementioned compounds an improved balance between different characteristics of the adhesive layer may be obtained, such as peeling strength, tackiness and/or reversibility of adherence. These properties of the adhesive layer in combination with the barrier to reduce plasticizer migration provides an appropriate floor covering.

Additionally or alternatively, said acrylic compounds may be formed on the basis of low Tg monomers, high Tg monomers, polar monomers, or combinations thereof. Glass transition temperature (Tg) of the monomers may be determining in providing a certain amount of peeling strength and/or tackiness of the adhesive layer. By preference, said acrylic compounds are formed on the basis of low Tg monomers, high Tg monomers and polar monomers, such that a further improved balance between different characteristics of the adhesive layer may be obtained. Furthermore, by forming the acrylic compounds in the aforementioned way it may be possible that the potential of absorption of plasticizers in the adhesive layer may be further reduced.

By preference, said acrylic compounds may be formed on the basis of between 70-90 wt. % of low Tg monomers, of between 0-30 wt. % of high Tg monomers, and of between 3-10 wt. % of polar monomers. By forming said acrylic compounds on the basis of the aforementioned amounts, a further improved balance between different characteristics of the adhesive layer may be obtained and/or the potential of absorption of plasticizers in the adhesive layer may be further reduced.

According to some embodiments, said low Tg monomers may be chosen from the group of 2-ethyl hexyl acrylate, n-butyl acrylate, iso-octyl acrylate, or combinations thereof.

According to some embodiments, said high Tg monomers my be chosen from the group of methyl methacrylate, methyl acrylate, vinyl acetate, styrene, or combinations thereof.

According to some embodiments, said polar monomers are chosen from the group of acrylic acid, 2-hydroxyl ethyl acrylate, n-vinyl pyrrolidone, or combinations thereof.

Additionally or alternatively, said adhesive layer may comprise one or more additives chosen from the group of surfactants, wetting agents, tackifiers, plasticizers, cross-linkers, thickeners, defoamers, antioxidants, pigments, fillers, or combinations thereof.

According to a second practical measure which forms an independent inventive aspect of the present invention, said floor element on its lower surface is treated. Herein, said barrier may be formed by the treated surface.

In light of the present invention, the wording "treated" means that physical and/or chemical properties of the treated surface are modified, such that plasticizer migration may preferably be reduced.

By preference, said floor element on its lower surface may be gamma radiation treated, plasma treated, UV (ultra-violet) radiation treated, flame treated, or combinations thereof.

According to a third practical measure which forms an independent inventive aspect of the present invention, said floor element comprises a barrier layer at a distance from its upper surface forming said barrier, preferably a backing layer on its lower surface.

Said barrier layer may have a plasticizer concentration which is higher than the plasticizer concentration between the upper surface and the barrier layer.

By preference, said barrier layer may comprise a plasticizer content of between 50 and 200 phr. By using a backing layer comprising plasticizer in the aforementioned range, migration of plasticizer may predominantly occur from the backing layer towards the adhesive layer, and migration from the remainder of the floor element may at least be delayed, or avoided in its entirety. By preference, said backing layer comprises a plasticizer content of between 75 and 100 phr.

According to a further or another embodiment, said barrier layer may comprise a plasticizer migration inhibitor, for example organic oligomers with reactive groups and liquid precursors, such as metal alkoxides.

According to a particularly preferred embodiment, said underlayment basic layer and said adhesive layer may form part of an underlayment. In light of the present invention, the wording "underlayment" should be understood as a support layer which is sandwiched between the floor element and a subfloor when the floor covering is installed on the subfloor.

According to some embodiments, said underlayment further may comprise a scrim layer, wherein said scrim layer is positioned in between the underlayment basic layer and the adhesive layer or wherein the scrim layer is at least partly embedded in the adhesive layer.

According to some embodiments, said underlayment further comprises a backing layer, preferably a non-woven backing layer, for example for creating thermal insulation, sound insulation or walking comfort.

According to some embodiments, said underlayment basic layer may comprise a synthetic material. By preference, said synthetic material is a foamed synthetic material, for example for creating thermal insulation, sound insulation or walking comfort.

Said underlayment may comprise a PU underlayment basic layer, which supports the adhesive layer. The PU underlayment basic layer is preferably a soft layer.

A PET (polyethylene terephthalate) foil may be sandwiched between the adhesive layer and the PU underlayment basic layer.

A lowermost layer of the underlayment may be a spunbond layer. Preferably, a hotmelt layer is sandwiched between the PU underlayment basic layer and the spunbond layer.

A lower side of the underlayment may be provided with double-sided adhesive tape strips which are located at a distance from each other. This minimizes a tendency of cupping or doming of the floor covering.

According to some embodiments, the underlayment comprises discrete continuous underlayment pieces which are located adjacent to each other, wherein the double-sided adhesive tape strips are located at edges of the underlayment pieces where the adjacent underlayment pieces meet each other. The underlayment pieces may be supplied as a roll. Upon installation, a plurality of adjacent underlayment pieces, for example unrolled strips, are laid on the subfloor. Since the double-sided adhesive tape is located at the edges of two adjacent underlayment pieces a continuous underlayment surface is formed. Additionally, the double-sided adhesive tape allows that the underlayment is at least partly adhered onto the subfloor, thereby improving dimensional stability of the floor covering as a whole.

The invention is also related to a floor element, preferably suitable for a floor covering as described hereinbefore, wherein said floor element comprises at least one plasticizer and its lower surface is treated thereby forming a barrier for reducing plasticizer through said barrier.

Said floor element on its lower surface may be gamma radiation treated, plasma treated, UV radiation treated, flame treated, or combinations thereof.

In an alternative embodiment said floor element comprises at least one plasticizer and is provided with a barrier layer at a distance from its upper surface forming a barrier for reducing plasticizer migration through said barrier.

Said barrier layer may comprise a backing layer on the lower surface of the floor element.

The invention is also related to an underlayment, preferably suitable for a floor covering as described hereinbefore, wherein said underlayment has an adhesive layer on top of an underlayment basic layer, which adhesive layer is covered by a release foil such that the adhesive layer is sandwiched between the release foil and the underlayment basic layer.

A lower side of the underlayment may be provided with double-sided adhesive tape strips which are located at a distance from each other.

The double-sided adhesive tape strips may be located at edges of the underlayment.

It is remarked, that in the interest of an easy recycling of a floor covering comprising an underlayment and glued thereon floor elements, it is preferred that the underlayment shows one or more of the following properties:

the property that said underlayment comprises an underlayment basic layer, wherein said underlayment basic layer comprises fillers, wherein said underlayment basic layer is essentially free from fillers having a Moh's hardness of 7 or more and/or wherein said underlayment basic layer is essentially free from sand and/or wherein the majority of said fillers have a Moh's hardness of 5 or less, or of 3 or less, and/or wherein the majority of said fillers is formed by $CaCO_3$ and/or talcum;

the property that said floor element comprises a core formed at least from a first thermoplastic material and said underlayment comprises an underlayment basic layer formed at least from a second thermoplastic material having a glass transition temperature of maximum 110% of the glass transition temperature as expressed in ° C. of said first thermoplastic material.

Preferably said first thermoplastic material is polyvinyl chloride. Preferably, said second thermoplastic material is a crystalline or semi-crystalline material, such as polyethylene or polypropylene or a copolymer of polyethylene and/or polypropylene, having a melting temperature below 200° C., preferably below 175° C.;

the property that the bottom of said underlayment is free from fibrous material;

the property that the bottom of said underlayment is free from crystalline or semi-crystalline thermoplastic material having a melting temperature above 200° C.;

the property that the bottom of said underlayment is formed by polyethylene;

the property that the bottom of said underlayment is formed by a foil of polypropylene, for example oriented polypropylene (OPP) or by a foil of polyethylene, for example high density polyethylene (HDPE).

The above properties each by itself and especially when combined may lead to a more fluent recycling process of a floor covering comprising a plurality of floor elements glued to said underlayment. The particular selection of fillers is such that a shredding or grinding device used in recycling may have a longer time in between maintenance. The choice of the second thermoplastic material is such that it may fluently be molten along with ubiquitous thermoplastic materials used as the first thermoplastic material, for example together with whether or not plasticized polyvinyl chloride (PVC). The absence of fibrous material at the bottom of the underlayment may prevent premature clogging of any filtration systems in recycling. The use of only relatively low melting temperature crystalline or semi-crystalline thermoplastic materials at the bottom of said underlayment, also warrants that these materials can fluently be molten along with extrusion of the first thermoplastic material, for example with PVC having a plasticizer content of 5 phr or less, or having a plasticizer content of more than 5 phr, for example 10 phr or more. The use of a foil at the bottom of said underlayment, as compared to for example a spunbond or other fibrous layer, lowers the risk that dirt or sands sticks to the bottom of the floor covering to be recycled.

The inventors also note that the use of polyurethane or elastomers, for example thermosetting elastomers, as material for said underlayment basic layer, may also be beneficial in recycling. These materials may be inert in recycling, and function as a filler while mixing and/or melting and/or extruding a moldable composition comprising the first thermoplastic material, for example PVC with less than or more than 5 phr of plasticizer, of the core.

It is clear that the present invention thus, in accordance with a particular independent aspect, also aims at a floor covering designed for more easy recycling. With this aim, the present invention is a floor covering comprising an underlayment with an underlayment basic layer, at least a plurality of floor elements and an adhesive layer, wherein said adhesive layer is positioned in between said underlayment basic layer and said floor elements, and wherein said floor element comprises at least a first material, said first material being thermoplastic, wherein said underlayment basic layer comprises at least a second material, said second material being polyurethane, an elastomeric, for example thermosetting, material or a thermoplastic material, with as a characteristic that said underlayment further comprises one, or a combination of two or more of the following properties:

the property that said underlayment basic layer comprises fillers, wherein said underlayment basic layer is essentially free from fillers having a Moh's hardness of 7 or more;

the property that said underlayment basic layer comprises fillers, wherein said underlayment basic layer is essentially free from sand;

the property that said underlayment basic layer comprises fillers, wherein the majority of said fillers have a Moh's hardness of 5 or less, or 3 or less and/or wherein the majority of said fillers is formed by $CaCO_3$ and/or talcum;

the property that said second material is thermoplastic having a glass transition temperature of maximum 110% of the glass transition temperature as expressed in ° C. of said first material;

the property that said second material is a crystalline or semi-crystalline thermoplastic material having a melting temperature below 200° C., preferably below 175° C.;

the property that the bottom of said underlayment is free from fibrous material;

the property that the bottom of said underlayment is free from crystalline or semi-crystalline thermoplastic material having a melting temperature above 200° C.;

the property that the bottom of said underlayment is formed by polyethylene;

the property that the bottom of said underlayment is formed by a foil of polypropylene, for example oriented polypropylene (OPP) or by a foil of polyethylene, for example high density polyethylene (HDPE).

It is clear that the floor covering of the present particular independent aspect may show one or more of the features of the floor covering of the first independent aspect and/or the preferred embodiments thereof without necessarily practicing the barrier layer described therein and without the floor elements necessarily comprising plasticizer. Especially the adhesive layers described in the context of the first independent aspect may be practiced here as well, for example an adhesive comprising PSA, wherein such adhesive may comprises an acrylic compound and a tackifier, for example rosin ester.

Preferably, said floor elements further at least comprise plasticizer, and a barrier is formed to reduce plasticizer migration from said floor elements towards said adhesive layer, said barrier preferably is formed by one or more of the following measures:

said adhesive layer has a lowered potential towards plasticizer absorption; and/or said floor element on its lower surface is treated thereby forming said barrier; and/or said floor element comprises a barrier layer at a distance from its upper surface forming said barrier, preferably a backing layer on its lower surface.

Preferably, said adhesive layer is present in an amount of between 5 and 90 g/m², preferably of between 5 and 75 g/m², more preferably of between 30 and 60 g/m², and/or said adhesive layer has a peeling strength as measured by DIN EN 1345:1993-12 of between 10 and 50 N/50 mm, preferably of between 30 and 50 N/50 mm.

Preferably, said adhesive layer comprises PSA and/or said adhesive layer comprises one or more acrylic compounds, silicone compounds, elastomers, or combinations thereof. For example an adhesive layer as described in the context of the first independent aspect of the present invention may be practiced.

Preferably, said underlayment basic layer and said adhesive layer form part of an underlayment. Said underlayment may further comprise a scrim layer, wherein said scrim layer is positioned in between the underlayment basic layer and the adhesive layer or wherein the scrim layer is at least partly embedded in the adhesive layer.

Said underlayment basic layer may comprise a foamed synthetic material.

According to the most preferred embodiment of the present particular independent aspect, the invention is a floor covering comprising an underlayment with an underlayment basic layer, at least a plurality of floor elements and an adhesive layer, preferably being or comprising a pressure sensitive adhesive, wherein said adhesive layer is positioned in between said underlayment basic layer and said floor elements, and wherein said floor element comprises at least polyvinyl chloride, wherein said underlayment basic layer comprises polyurethane, or, alternatively, comprises polyvinyl chloride, characterized in that said underlayment further comprises the following properties in combination:

the property that said underlayment basic layer comprises fillers, wherein the majority of said fillers have a Moh's hardness of 5 or less and/or wherein the majority of said fillers is formed by $CaCO_3$ and/or talcum. Preferably said underlayment basic layer is free from fillers having a Moh's hardness of 7 or more;

the property that the bottom of said underlayment is formed by a foil of polypropylene (PP), for example oriented polypropylene (OPP) or by a foil of polyethylene (PE), for example high density polyethylene (HDPE).

Preferably a PET (polyethylene terephthalate) foil is sandwiched between said adhesive layer and said underlayment basic layer. Preferably, said underlayment basic layer and said adhesive layer form part of an underlayment, that is originally provided separately from said floor elements, for example in a roll. Preferably, such underlayment comprises a release foil covering said adhesive layer, wherein said release foil is preferably removed upon installation of said floor elements.

Said underlayment basic layer preferably from at least half, or at least 80%, of the thickness between the bottom of the floor elements and the ground or subfloor whereupon said floor covering is installed and/or at least half, or at least 80%, of the thickness of the assembly of adhesive layer, underlayment basic layer and the PP or PE foil.

It is noted that the floor elements of the present particular independent aspect and other aspects or the invention, as well of said most preferred embodiment may comprise a core supporting a decorative layer and a wear layer protecting said decorative layer. The decorative layer may be formed by a printed PVC film, and the wear layer may essentially consist of PVC. As an example the wear layer may comprise a layer of PVC and a layer of a radiation cured lacquer that may have a significantly smaller thickness than the thickness of said layer of PVC, for example at least 8 times smaller or 10 times smaller. For example said layer of PVC may have a thickness of at least 500 µm, while said lacquer layer has a thickness of at most 50 µm. The present invention is of particular importance with such lacquered floor elements since the tendency of curling is higher due to residual tension in the lacquer layer.

The thickness of the floor elements applied in the context of the present invention, in general, may be 4 mm or less, for example 2.5 mm or less. It are especially these thin floor elements that may suffer from curling and profit from being applied using an underlayment basic layer and an adhesive layer in between said underlayment basic layer and said floor elements. Preferably the floor elements are so-called dryback or gluedown floor elements. The floor elements are preferably free from mechanical coupling parts at one or both pairs of edges thereof. It is of course not excluded that the invention would be applied with floor elements having a thickness larger than 4 mm, for example between 4 and 7 mm and/or with floor elements having mechanical coupling parts at one or both pairs of edges wherein these mechanical coupling parts allow to bring two such panels in a coupled condition wherein a locking is obtained at the respective edges in a horizontal direction perpendicular to these edges and in the plane of the coupled panels as well as in a vertical direction perpendicular to said plane.

Where melting temperatures or glass transition temperatures have been described, these are measured by means of DSC (differential scanning calorimetry) in accordance with ISO 11357-3:2018, for example at 20° C./min heating rate.

It is further noted that the present invention also relates to a method wherein such floor coverings are recycled. And hence the present invention is a method for manufacturing objects, preferably floor elements, comprising at least the following steps:

the step of shredding a floor covering having the characteristics of any of the preceding claims into a ground material;

the step of forming a moldable thermoplastic composition at least by heating and/or filtering said ground material;

the step of extruding said moldable thermoplastic composition into pellets for subsequent molding of said object or part thereof, or the step of extruding said moldable thermoplastic composition into said object or part thereof.

Preferably, said step of forming a moldable thermoplastic composition comprises adding said ground material to a hot-cold mixing vessel and/or adding said ground material into the feed of an extruder.

The present invention further is a floor element obtained or obtainable through said method for manufacturing objects or the preferred embodiments thereof. Preferably, said floor element comprises a core and a provided thereon decorative layer, and in that said core is obtained from said moldable thermoplastic composition. Preferably said core comprise particles of polyurethane. These particles may originate from a polyurethane comprising underlayment basic layer.

BRIEF DESCRIPTION OF THE DRAWINGS

In order to better demonstrate the features of the invention, some preferred embodiments are described below, by way of example and without any limiting character, with reference to the accompanying drawings, wherein:

FIG. 5 is a similar view as FIG. 1, showing a part of another alternative embodiment of the floor covering.

FIG. 6 is a similar view as FIG. 3, showing the floor element of the floor covering as shown in FIG. 5 on a larger scale.

FIG. 7 is a similar view as FIG. 1, showing a part of still another alternative embodiment of the floor covering.

DETAILED DESCRIPTION OF THE INVENTION

Figure 1:
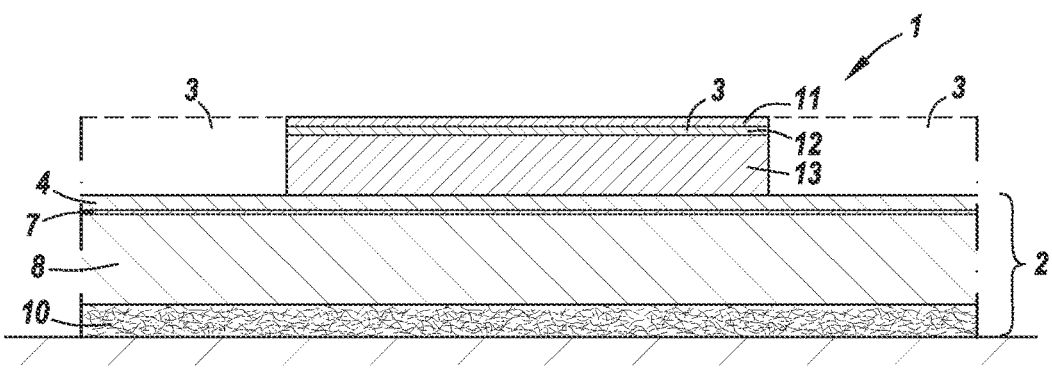
FIG. 1 is a cross-sectional view of a part of an embodiment of a floor covering according to the invention.

FIG. 1 shows a part of an embodiment of a floor covering 1 according to the present invention. The floor covering 1 is installed on the ground, i.e. a subfloor, and comprises an underlayment 2 and a floor element 3 which is fixed to the underlayment 2 through an adhesive layer 4. In reality, a plurality of floor elements 3 will be placed next to each other on the underlayment 2. The underlayment 2 may be supplied in the form of a roll and unrolled on the ground during installation of the floor covering 1.

The adhesive layer 4 forms part of the underlayment 2 in this case. More specifically, it forms part of the underlayment 2 already before installing the floor covering 1. In an alternative embodiment (not shown) the adhesive layer 4 may be applied as a separate layer onto a support.

Figure 2:
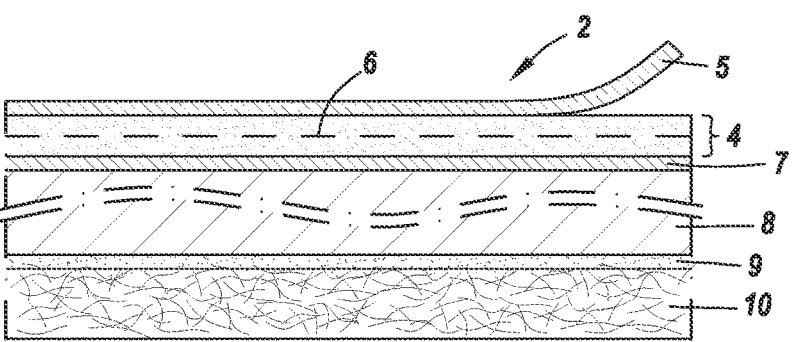
FIG. 2 is a similar view as FIG. 1, showing apart of an underlayment of the floor covering of FIG. 1 on a larger scale.

FIG. 2 shows a cross-section of the underlayment 2 before installing the floor covering 1. On top of the adhesive layer 4 is a release foil 5 for temporarily protecting the adhesive layer 4. In the situation as shown in FIG. 1 the release foil 5 is removed from the adhesive layer 4, which allows the floor element 3 to be secured onto the underlayment 2. The adhesive layer 4 is provided with a scrim 6 for creating stability during manufacturing the underlayment 2. The adhesive layer 4 is supported by a PET foil 7 which in turn lies on top of aPolyurethane (PU) underlayment basic layer 8. In the embodiment as shown in FIG. 2 the scrim is embedded in the adhesive layer 4, but it may also be positioned between the adhesive layer 4 and the PET foil 7. The PU underlayment basic layer 8 may be a soft layer, for example a foam, and may include a filler. A hotmelt layer 9 is sandwiched between the PU underlayment basic layer 8 and a lowermost Polypropylene (PP) spunbond layer 10. The spunbond layer 10 forms the lowermost layer of the underlayment 2. The PU underlayment basic layer 8 forms at least half of the thickness of the underlayment 2, or, at least half of the thickness formed by the adhesive layer 4, the PET foil 7, the underlayment basic layer 8 and the spunbond layer 10, i.e. at least half of the thickness formed between the bottom of the floor elements 3 and the ground whereupon the floor covering 1 is installed.

Figure 3:
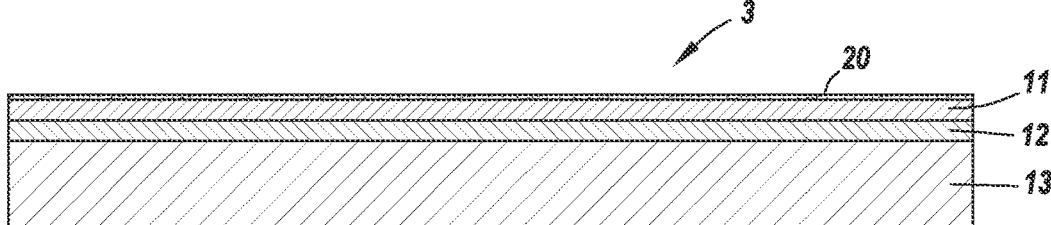
FIG. 3 is a similar view as FIG. 1, showing a floor element of the floor covering of FIG. 1 on a larger scale.

FIG. 3 shows a cross-section of the floor element 3 of the embodiment of the floor covering 1 as shown in FIG. 1. The floor element 3 is made of plastic and may be a luxury vinyl tile (LVT). An upper side of the floor element 3 is provided with a wear layer 11, for example essentially of PVC, which protects a decorative layer 12, for example formed by a printed PVC film, of the floor element 3. The decorative layer 12 is supported by a core 13 of which a lower side is attached to the underlayment 2. The core 13 comprises a polymer, such as a PVC, which contains plasticizers for providing resiliency of the floor element 1.

In the embodiment as shown in FIGS. 1 and 2 the adhesive layer 4 comprises a pressure sensitive adhesive (PSA), but alternative adhesives are conceivable. In the embodiment as shown in FIGS. 1 and 2 adhesive in the adhesive layer 4 comprises a plasticizer migration inhibitor, such that the adhesive layer 4 has a lowered potential towards plasticizer absorption. This minimizes plasticizer migration from the floor element 3 towards the adhesive layer 4, causing minimal tendency of cupping or doming of the floor covering 1 during its lifetime.

The adhesive layer 4 may be present in an amount of between 5 and 90 g/m$^2$, preferably of between 5 and 75 g/m$^2$ and more preferably of between 30 and 60 g/m$^2$. A lowered amount of the adhesive layer 4 may cause a lowered tendency to migration of plasticizers from the floor element 3 towards the underlayment 2. The amount of the adhesive layer 4 may be a compromise between lowered plasticizer migration and sufficient peeling strength. The adhesive layer 4 may have a peeling strength as measured by DIN EN 1345:1993-12 of between 10 and 50 N/50 mm, preferably of between 30 and 50 N/50 mm.

The adhesive layer 4 may comprise a plasticizer content of between 50 and 200 phr, preferably of between 75 and 100 phr. The adhesive layer 4 may comprise an elevated plasticizer content in order to minimize plasticizer migration from the floor element 3 to the underlayment 2. For example, the plasticizer concentration may be higher than the plasticizer concentration of the floor element 3.

The adhesive layer may comprise one or more acrylic compounds, silicone compounds, elastomers, or combinations thereof. The acrylic compounds may be chosen from the group of acrylic polymers, acrylic copolymers, acrylic terpolymers, or combinations thereof. The acrylic compounds may be formed on the basis of low Tg monomers, high Tg monomers, polar monomers, or combinations thereof. For example, the acrylic compounds may be formed on the basis of between 70-90 wt. % of low Tg monomers, of between 0-30 wt. % of high Tg monomers, and of between 3-10 wt. % of polar monomers. More specifically, the low Tg monomers may be chosen from the group of 2-ethyl hexyl acrylate, n-butyl acrylate, iso-octyl acrylate, or combinations thereof, the high Tg monomers may be chosen from the group of methyl methacrylate, methyl acrylate, vinyl acetate, styrene, or combinations thereof, and the polar monomers may be chosen from the group of acrylic acid, 2-hydroxyl ethyl acrylate, n-vinyl pyrrolidone, or combinations thereof. Furthermore, the adhesive layer may comprise one or more additives chosen from the group of surfactants, wetting agents, tackifiers, plasticizers, crosslinkers, thickeners, defoamers, antioxidants, pigments, fillers, or combinations thereof.

Figure 4:
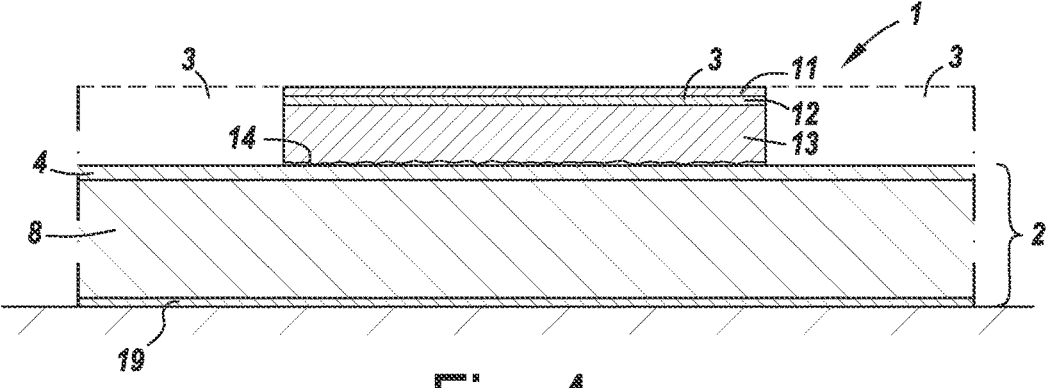
FIG. 4 is a similar view as FIG. 1, showing a part of an alternative embodiment of the floor covering.

FIG. 4 shows an alternative embodiment of the floor covering 1 in which the floor element 3 on its lower surface is treated such that a barrier is formed to reduce plasticizer migration from the floor element 3 towards the adhesive layer 4. The treated section is indicated by a fine serration 14, but in reality the lower surface may be smooth. The lower surface may be gamma radiation treated, plasma treated, UV radiation treated, flame treated, or combinations thereof, which may result in highly compact structures and hinder migration.

FIG. 5 shows another alternative embodiment, in which a lower side of the floor element 3 is provided with a backing layer 16 which forms a barrier to reduce plasticizer migration from the floor element 3 towards the adhesive layer 4. The backing layer 16 may comprise a plasticizer content of between 50 and 200 phr, preferably of between 75 and 100 phr. The backing layer 16 may comprise a plasticizer migration inhibitor, for example organic oligomers with reactive groups and liquid precursors, such as metal alkoxides. The backing layer 16 may also comprise nanoparticles, such as silica dioxide (SiO2), starch nanocrystals and cellulose nanocrystals, to achieve lowered migration of plasticizers. FIG. 6 shows that the floor element 3 differs from the floor element 3 as shown in FIG. 3 in that the backing layer 16 is fixed to the core 13.

The embodiments of the floor covering 1 as described hereinbefore cause minimized plasticizer migration, which advantageously leads to minimized doming or cupping of the floor element 3. When a sample of the floor element 3 that is applied on the underlayment 2 is exposed to heat according to ISO 23999:2018 the sample has a mean value for final curling between −2.5 and 2.5 mm, preferably of between −1.0 and 0 mm.

FIG. 7 shows still another alternative embodiment of the floor covering 1 which has a similar floor element 3 and underlayment 2 as the embodiment as shown in FIG. 1, but in which a lower side of the underlayment 2 is provided with double-sided adhesive tape strips 17 which are located at a distance from each other. The double-sided adhesive tape strips 17 minimize the risk of curling of the floor covering 1. This solution may be applied without measures to reduce plasticizer migration from the floor element 3 towards the adhesive layer 4. The embodiment as shown in FIG. 7 shows three adjacent underlayment pieces of the underlayment 2, separated by edges 18 of each underlayment piece. The double-sided adhesive tape 17 is provided at the edges 18 of the underlayment pieces such that the lower surface of the underlayment 2 forms a more or less continuous surface. The underlayment pieces may be supplied as rolls which are unrolled, thus forming strips, on the subfloor and placed next to each other as illustrated in FIG. 7.

The underlayment 2 illustrated in FIGS. 4, 5 and 7 comprise a foil 19 of HDPE at the bottom. The polyurethane underlayment basis layer 8 in these cases comprises fillers, wherein these fillers are for the majority formed by $CaCO_3$. As such the embodiments of the floor covering 1 illustrated by means of the FIGS. 4 to 7 are examples of the particular independent aspect and the most preferred embodiment thereof mentioned in the introduction.

FIGS. 3 and 6 further illustrate that a lacquer layer 20 may be applied on top of said wear layer 11, wherein the lacquer layer 20 preferably has a significantly smaller thickness than said wear layer 11.

The present disclosure further concerns aspects and embodiments as defined by the following numbered paragraphs.

1.—Floor covering comprising an underlayment basic layer 8, at least one floor element 3 and an adhesive layer 4, wherein said adhesive layer 4 is positioned in between said underlayment basic layer 8 and said floor element 3, and wherein said floor element 3 comprises at least one plasticizer, characterized in that, a barrier is formed to reduce plasticizer migration from said floor element 3 towards said adhesive layer 4, said barrier preferably is formed by one or more of the following measures:

said adhesive layer 4 has a lowered potential towards plasticizer absorption; and/or said floor element 3 on its lower surface is treated thereby forming said barrier 14; and/or said floor element 3 comprises a barrier layer at a distance from its upper surface forming said barrier, preferably a backing layer 16 on its lower surface.

2.—Floor covering according to numbered paragraph 1, characterized in that, said floor element 3 when applied on said underlayment basic layer 8 has a mean value for final curling as measured according to ISO 23999:2018 of between –2.5 and 2.5 mm, preferably of between –1.0 and 0 mm.

3.—Floor covering according to numbered paragraph 1 or 2, characterized in that, said adhesive layer 4 has a lowered potential towards plasticizer absorption.

4.—Floor covering according to numbered paragraph 3, characterized in that, said adhesive layer 4 also contains said plasticizer.

5.—Floor covering according to numbered paragraph 4, characterized in that, the concentration of said plasticizer in the adhesive layer is higher than 50%, preferably more than 75%, more preferably more than 100% of the concentration of said plasticizer in the floor element 3.

6.—Floor covering according to any one of preceding numbered paragraphs, characterized in that, said adhesive layer 4 is present in an amount of between 5 and 90 g/m$^2$, preferably of between 5 and 75 g/m$^2$, more preferably of between 30 and 60 g/m$^2$.

7.—Floor covering according to any one of preceding numbered paragraphs, characterized in that, said adhesive layer 4 has a peeling strength as measured by DIN EN 1345:1993-12 of between 10 and 50 N/50 mm, preferably of between 30 and 50 N/50 mm.

8.—Floor covering according to any one of preceding numbered paragraphs, characterized in that, said adhesive layer 4 comprises a plasticizer content of between 50 and 200 phr, preferably of between 75 and 100 phr.

9.—Floor covering according to any one of preceding numbered paragraphs, characterized in that, said adhesive layer 4 and/or said floor element 3 comprises a plasticizer migration inhibitor, for example organic oligomers with reactive groups and liquid precursors, such as metal alkoxides.

10.—Floor covering according to any one of preceding numbered paragraphs, characterized in that, said adhesive layer comprises a pressure sensitive adhesive (PSA).

11.—Floor covering according to any one of preceding numbered paragraphs, characterized in that, said adhesive layer 4 comprises one or more acrylic compounds, silicone compounds, elastomers, or combinations thereof.

12.—Floor covering according to numbered paragraph 11, characterized in that, said acrylic compounds are chosen from the group of acrylic polymers, acrylic copolymers, acrylic terpolymers, or combinations thereof.

13.—Floor covering according to numbered paragraph 11 or 12, characterized in that, said acrylic compounds are formed on the basis of low Tg monomers, high Tg monomers, polar monomers, or combinations thereof.

14.—Floor covering according to numbered paragraph 13, wherein said acrylic compounds are formed on the basis of between 70-90 wt. % of low Tg monomers, of between 0-30 wt. % of high Tg monomers, and of between 3-10 wt. % of polar monomers.

15.—Floor covering according to numbered paragraph 13 or 14, characterized in that, said low Tg monomers are chosen from the group of 2-ethyl hexyl acrylate, n-butyl acrylate, iso-octyl acrylate, or combinations thereof.

16.—Floor covering according to any one of numbered paragraphs 13-15, characterized in that, said high Tg monomers are chosen from the group of methyl methacrylate, methyl acrylate, vinyl acetate, styrene, or combinations thereof.

17.—Floor covering according to any one of numbered paragraphs 13-16, characterized in that, said polar monomers are chosen from the group of acrylic acid, 2-hydroxyl ethyl acrylate, n-vinyl pyrrolidone, or combinations thereof.

18.—Floor covering according to any one of preceding numbered paragraphs, characterized in that, said adhesive layer 4 comprises one or more additives chosen from the group of surfactants, wetting agents, tackifiers, plasticizers, crosslinkers, thickeners, defoamers, antioxidants, pigments, fillers, or combinations thereof.

19.—Floor covering according to any one of preceding numbered paragraphs, characterized in that, said floor element 3 on its lower surface is treated thereby forming said barrier.

20.—Floor covering according to any one of preceding numbered paragraphs, characterized in that, said floor element 3 on its lower surface is gamma radiation treated, plasma treated, UV radiation treated, flame treated, or combinations thereof.

21.—Floor covering according to any one of preceding numbered paragraphs, characterized in that, said floor element 3 comprises a barrier layer 16 at a distance from its upper surface forming said barrier, preferably a backing layer 16 on its lower surface.

22.—Floor covering according to numbered paragraph 21, characterized in that, said barrier layer has a plasticizer concentration which is higher than the plasticizer concentration between the upper surface and the barrier layer.

23.—Floor covering according to numbered paragraph 21 or 22, characterized in that, said barrier layer comprises a plasticizer content of between 50 and 200 phr, preferably of between 75 and 100 phr.

24.—Floor covering according to any one of numbered paragraphs 21 or 23, characterized in that, said barrier layer 16 comprises a plasticizer migration inhibitor, for example organic oligomers with reactive groups and liquid precursors, such as metal alkoxides.

25.—Floor covering according to any one of preceding numbered paragraphs, characterized in that, said underlayment basic layer 8 and said adhesive layer 4 form part of an underlayment 2.

26.—Floor covering according to numbered paragraph 25, characterized in that, said underlayment 2 further comprises a scrim layer 6, wherein said scrim layer 6 is positioned in between the underlayment basic layer 8 and the adhesive layer 4 or wherein the scrim layer 6 is at least partly embedded in the adhesive layer 4.

27.—Floor covering according to numbered paragraphs 25 or 26, characterized in that, said underlayment 2 further comprises a backing layer 10, preferably a non-woven backing layer.

28.—Floor covering according to any one of numbered paragraphs 25-27, characterized in that, said underlayment basic layer 8 comprises a synthetic material, preferably a foamed synthetic material.

29.—Floor covering according to any one of preceding numbered paragraphs, characterized in that, said underlayment 2 comprises a PU underlayment basic layer 8, which supports the adhesive layer 4, which PU underlayment basic layer 8 is preferably a soft layer.

30.—Floor covering according to numbered paragraph 29, characterized in that, a PET foil 7 is sandwiched between the adhesive layer 4 and the PU underlayment basic layer 8.

31.—Floor covering according to numbered paragraph 30, characterized in that, a lowermost layer of the underlayment 2 is a spunbond layer 10, wherein preferably a hotmelt layer 9 is sandwiched between the PU underlayment basic layer 8 and the spunbond layer 10.

32.—Floor covering according to any one of preceding numbered paragraphs, characterized in that, a lower side of the underlayment 2 is provided with double-sided adhesive tape strips 17 which are located at a distance from each other.

33.—Floor covering according to numbered paragraph 32, characterized in that, the underlayment 2 comprises discrete continuous underlayment pieces which are located adjacent to each other, wherein the double-sided adhesive tape strips are located at edges 18 of the underlayment pieces where the adjacent underlayment pieces meet each other.

34.—Floor element, characterized in that, said floor element 3 comprises at least one plasticizer and its lower surface is treated thereby forming a barrier 14 for reducing plasticizer through said barrier.

35.—Floor element according to numbered paragraph 34, characterized in that, said floor element 3 on its lower surface is gamma radiation treated, plasma treated, UV radiation treated, flame treated, or combinations thereof.

36.—Floor element, characterized in that, said floor element 3 comprises at least one plasticizer and is provided with a barrier layer 16 at a distance from its upper surface forming a barrier for reducing plasticizer migration through said barrier.

37.—Floor element according to numbered paragraph 36, characterized in that, said barrier layer comprises a backing layer 16 on the lower surface of the floor element 3.

38.—Underlayment characterized in that, said underlayment 2 has an adhesive layer 4 on top of an underlayment basic layer 8, which adhesive layer 4 is covered by a release foil 5 such that the adhesive layer 4 is sandwiched between the release foil 5 and the underlayment basic layer 8.

39.—Underlayment according to numbered paragraph 38, characterized in that, a lower side of the underlayment 2 is provided with double-sided adhesive tape strips 17 which are located at a distance from each other.

40.—Underlayment according to numbered paragraph 39, characterized in that, the double-sided adhesive tape strips 17 are located at edges 18 of the underlayment 2.

41.—Floor covering comprising an underlayment 2 with an underlayment basic layer 8, at least a plurality of floor elements 3 and an adhesive layer 4, wherein said adhesive layer 4 is positioned in between said underlayment basic layer 8 and said floor elements 3, and wherein said floor element 3 comprises at least a first material, said first material being thermoplastic, wherein said underlayment basic layer 8 comprises at least a second material, said second material being being polyurethane, an elastomeric, for example thermosetting, material or a thermoplastic material, characterized in that said underlayment further comprises one, or a combination of two or more of the following properties:

the property that said underlayment basic layer 8 comprises fillers, wherein said underlayment basic layer 8 is essentially free from fillers having a Moh's hardness of 7 or more;

the property that said underlayment basic layer 8 comprises fillers, wherein said underlayment basic layer 8 is essentially free from sand;

the property that said underlayment basic layer 8 comprises fillers, wherein the majority of said fillers have a Moh's hardness of 5 or less, or of 3 or less, and/or wherein the majority of said fillers is formed by $CaCO_3$ and/or talcum;

the property that said second material is thermoplastic having a glass transition temperature of maximum 110% of the glass transition temperature as expressed in ° C. of said first material;

the property that said second material is thermoplastic having a melting temperature below 200° C., preferably below 175° C.;

the property that the bottom of said underlayment 2 is free from fibrous material;

the property that the bottom of said underlayment 2 is free from thermoplastic material having a melting temperature above 200° C.;

the property that the bottom of said underlayment 2 is formed by polyethylene;

the property that the bottom of said underlayment 2 is formed by a foil of polypropylene, for example oriented polypropylene (OPP) or by a foil of polyethylene, for example high density polyethylene (HDPE).

42.—Floor covering according to numbered paragraph 41, characterized in that said floor elements 3 further at least comprise plasticizer, and a barrier is formed to reduce plasticizer migration from said floor elements 3 towards said adhesive layer 4, said barrier preferably is formed by one or more of the following measures:

said adhesive layer 4 has a lowered potential towards plasticizer absorption; and/or said floor element 3 on its lower surface is treated thereby forming said barrier 14; and/or said floor element 3 comprises a barrier layer at a distance from its upper surface forming said barrier, preferably a backing layer 16 on its lower surface.

43.—Floor covering according to numbered paragraphs 41 or 42, characterized in that said adhesive layer 4 is present in an amount of between 5 and 90 g/m², preferably of between 5 and 75 g/m², more preferably of between 30 and 60 g/m², and that said adhesive layer 4 has a peeling strength as measured by DIN EN 1345:1993-12 of between 10 and 50 N/50 mm, preferably of between 30 and 50 N/50 mm.

44.—Floor covering according to any one of preceding numbered paragraphs 41 to 43, characterized in that, said adhesive layer 4 comprises one or more acrylic compounds, silicone compounds, elastomers, or combinations thereof.

45.—Floor covering according to numbered paragraph 44, wherein said acrylic compounds are formed on the basis of between 70-90 wt. % of low Tg monomers, of between 0-30 wt. % of high Tg monomers, and of between 3-10 wt. % of polar monomers.

46.—Floor covering according to any one of preceding numbered paragraphs 41 to 45, characterized in that, said underlayment basic layer 8 and said adhesive layer 4 form part of an underlayment 2.

47.—Floor covering according to paragraph 46, characterized in that, said underlayment 2 further comprises a scrim layer 6, wherein said scrim layer 6 is positioned in between the underlayment basic layer 8 and the adhesive layer 4 or wherein the scrim layer 6 is at least partly embedded in the adhesive layer 4.

48.—Floor covering according to any one of the preceding numbered paragraphs 41 to 47, characterized in that, said underlayment basic layer 8 comprises a synthetic material, preferably a foamed synthetic material.

49.—Method for manufacturing objects, preferably floor elements 3, comprising at least the following step:

the step of shredding a floor covering 1 having the characteristics of any of the preceding claims into a ground material;

the step of forming a moldable thermoplastic composition at least by heating and/or filtering said ground material;

the step of extruding said moldable thermoplastic composition into pellets for subsequent molding of said object or part thereof, or the step of extruding said moldable thermoplastic composition into said object or part thereof.

50.—Method in accordance with numbered paragraph 49, characterized in that said step of forming a moldable thermoplastic composition comprises adding said ground material to a hot-cold mixing vessel and/or adding said ground material into the feed of an extruder.

51.—Floor element obtained through the method of numbered paragraph 49 or 50, characterized in that said floor element 3 comprises a core 13 and a provided thereon decorative layer 12, and in that said core 3 is obtained from said moldable thermoplastic composition.

The aspects and concepts disclosed in the claims and drawings may be combined with one another as long as they are not mutually contradictory. The present invention is by no means limited to the embodiments described above, however a decorative panel may be realized according to various variants without departing from the scope of the present invention.

The invention claimed is:

1. A floor covering comprising an underlayment with an underlayment basic layer, at least a plurality of floor elements and an adhesive layer, wherein said adhesive layer is positioned in between said underlayment basic layer and said floor elements, and wherein said floor element comprises at least polyvinyl chloride, wherein said underlayment basic layer comprises polyurethane or polyvinyl chloride, wherein said underlayment further comprises the following properties in combination:

said underlayment basic layer comprises fillers, wherein the majority of said fillers have a Moh's hardness of 5 or less and/or wherein the majority of said fillers is formed by $CaCO_3$ and/or talcum;

a bottom of said underlayment is formed by a foil of polypropylene or a foil of polyethylene.

2. The floor covering according to claim 1, wherein said floor elements further at least comprise plasticizer, and a barrier is formed to reduce plasticizer migration from said floor elements towards said adhesive layer, said barrier is formed by one or more of the following measures:

said adhesive layer has a lowered potential towards plasticizer absorption; and/or said floor element on its lower surface is treated to form said barrier; and/or said floor element comprises a barrier layer at a distance from its upper surface forming said barrier.

3. The floor covering according to claim 1, wherein said adhesive layer is present in an amount of between 5 and 90 g/m, and that said adhesive layer has a peeling strength as measured by DIN EN 1345:1993-12 of between 10 and 50 N/50 mm.

4. The floor covering according to claim 1, wherein said adhesive layer comprises a pressure sensitive adhesive and/ or one or more acrylic compounds, silicone compounds, elastomers, or combinations thereof.

5. The floor covering according to claim 4, wherein said acrylic compounds are formed on the basis of between 70-90 wt. % of low Tg monomers, of between 0-30 wt. % of high Tg monomers, and of between 3-10 wt. % of polar monomers.

6. The floor covering according to claim 1, wherein said underlayment basic layer and said adhesive layer form part of an underlayment.

7. The floor covering according to claim 6, wherein said underlayment further comprises a scrim layer, wherein said scrim layer is positioned in between the underlayment basic layer and the adhesive layer or wherein the scrim layer is at least partly embedded in the adhesive layer.

8. The floor covering according to claim 1, wherein said underlayment basic layer comprises a synthetic material.

9. A method for manufacturing objects, comprising at least the following steps:

shredding a floor covering having the characteristics of claim 1 into a ground material;

forming a moldable thermoplastic composition at least by heating and/or filtering said ground material;

extruding said moldable thermoplastic composition into pellets for subsequent molding of said object or part thereof, or the step of extruding said moldable thermoplastic composition into said object or part thereof.

10. The method according to claim 9, wherein said step of forming a moldable thermoplastic composition comprises adding said ground material to a hot-cold mixing vessel and/or adding said ground material into the feed of an extruder.

11. The floor element obtained through the method of claim 9, wherein said floor element comprises a core and a provided thereon decorative layer, and in that said core is obtained from said moldable thermoplastic composition.

12. The floor covering according to claim 1, wherein the bottom of said underlayment is formed by a foil of oriented polypropylene (OPP).

13. The floor covering according to claim 1, wherein the bottom of said underlayment is formed by a foil of high density polyethylene (HDPE).

14. A floor covering comprising an underlayment with an underlayment basic layer, at least a plurality of floor elements and an adhesive layer, wherein said adhesive layer is positioned in between said underlayment basic layer and said floor elements, and wherein said floor element comprises at least polyvinyl chloride, wherein said underlayment basic layer comprises polyurethane or polyvinyl chloride, wherein said underlayment further comprises the following properties in combination:

the property that said underlayment basic layer comprises fillers, wherein the majority of said fillers have a Moh's hardness of 5 or less and/or wherein the majority of said fillers is formed by $CaCO_3$ and/or talcum;

the property that the bottom of said underlayment is formed by a foil of polypropylene or by a foil of polyethylene;

wherein said underlayment basic layer and said adhesive layer form part of an underlayment;

wherein said adhesive layer comprises a pressure sensitive adhesive (PSA);

wherein the underlayment comprises a PET (polyethylene terephthalate) foil between the adhesive layer and the underlayment basic layer.

15. The floor covering of claim 14, wherein said underlayment further comprises a scrim layer, wherein said scrim layer is positioned in between the underlayment basic layer and the adhesive layer or wherein the scrim layer is at least partly embedded in the adhesive layer.

* * * * *